(12) United States Patent
Kitchin et al.

(10) Patent No.: US 8,179,869 B2
(45) Date of Patent: May 15, 2012

(54) REDUNDANT MULTICAST SERVICE IN WIRELESS NETWORK

(75) Inventors: Duncan Kitchin, Beaverton, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 11/714,371

(22) Filed: Mar. 6, 2007

(65) Prior Publication Data
US 2008/0219189 A1    Sep. 11, 2008

(51) Int. Cl.
*H04J 3/00* (2006.01)
(52) U.S. Cl. .................. 370/337; 370/329; 370/336
(58) Field of Classification Search ............ 375/132, 375/262; 370/252, 227, 328, 390, 401, 476, 370/341, 337
See application file for complete search history.

(56) References Cited

U.S. PATENT DOCUMENTS

| | | | | |
|---|---|---|---|---|
| 3,646,441 | A * | 2/1972 | Magnuski | 375/211 |
| 5,488,737 | A * | 1/1996 | Harbin et al. | 455/562.1 |
| 6,058,312 | A * | 5/2000 | Kimura | 455/445 |
| 6,347,223 | B1 * | 2/2002 | Schreib | 455/403 |
| 6,751,199 | B1 * | 6/2004 | Sindhushayana et al. | 370/252 |
| 6,909,698 | B1 * | 6/2005 | Moon | 370/252 |
| 6,944,123 | B1 * | 9/2005 | Moon | 370/216 |
| 7,023,810 | B1 * | 4/2006 | Moon | 370/252 |
| 7,103,019 | B1 * | 9/2006 | Moon | 370/328 |
| 7,328,394 | B2 | 2/2008 | Fa et al. | 714/776 |
| 7,385,954 | B2 * | 6/2008 | Gopalakrishnan et al. | 370/335 |
| 2002/0118666 | A1 | 8/2002 | Stanwood et al. | |
| 2002/0193114 | A1 * | 12/2002 | Agrawal et al. | 455/442 |
| 2004/0057456 | A1 * | 3/2004 | He et al. | 370/465 |
| 2004/0117498 | A1 * | 6/2004 | Hashimoto et al. | 709/230 |
| 2004/0128454 | A1 * | 7/2004 | Altahan et al. | 711/154 |
| 2004/0258135 | A1 * | 12/2004 | Higgins, Jr. | 375/132 |
| 2005/0013303 | A1 * | 1/2005 | Gopalakrishnan et al. | 370/395.21 |
| 2006/0031738 | A1 * | 2/2006 | Fay et al. | 714/758 |
| 2006/0034239 | A1 * | 2/2006 | Abeta et al. | 370/341 |
| 2006/0280205 | A1 * | 12/2006 | Cho | 370/473 |

(Continued)

FOREIGN PATENT DOCUMENTS
EP    1427146 A    6/2004
(Continued)

OTHER PUBLICATIONS

Sternad et al., "Towards Systems Beyond 3G Based on Adaptive OFDMA Transmission" Proceedings of the IEEE, vol. 95, No. 12, Dec. 1, 2007, pp. 2432-2455.

(Continued)

*Primary Examiner* — Jean Gelin
*Assistant Examiner* — Nathan Taylor
(74) *Attorney, Agent, or Firm* — Schwabe, Williamson & Wyatt, P.C.

(57) ABSTRACT

In a wireless network in which the base station has full duplex capability (can transmit on the downlink channel and simultaneously receive on the uplink channel), but the mobile stations have only half duplex capability (each can transmit on the uplink channel and receive on the downlink channel, but not simultaneously), the base station may transmit duplicate copies of multicast data in two or more frames. Some of the addressed mobile station may be scheduled to receive the first frame and transmit during the second frame, while the other addressed mobile stations may be scheduled to transmit during the first frame and receive the second frame.

12 Claims, 5 Drawing Sheets

U.S. PATENT DOCUMENTS

2007/0058584 A1* 3/2007 Sutskover .................. 370/330
2008/0112350 A1* 5/2008 Nanda et al. ................ 370/312

FOREIGN PATENT DOCUMENTS

WO 2008/109453 A1 9/2008

OTHER PUBLICATIONS

International Search Report on Written Opinion received for PCT Patent Application No. PCT/US2008/055522, mailed on Jul. 30, 2008, 10 pages.

International Preliminary Report on Patentability received for PCT Patent Application No. PCT/US2008/055522, mailed on Sep. 17, 2009, 6 pages.

International Search Report for PCT/US2008/055522; Dated Feb. 29, 2008; 10 pages.

Office Action issued Dec. 8, 2011 from European Patent Application No. 08731146.0.

Office Action issued Nov. 24, 2011 from Japanese Patent Application No. 2009-544332.

\* cited by examiner

REDUNDANT MULTICAST SERVICE IN WIRELESS NETWORK

BACKGROUND

In a wireless network using half duplex frequency division duplex (HFDD), such as that permitted in a WiMAX network, a base station may have full duplex capability, i.e., the base station can transmit downlink traffic on one frequency and simultaneously receive uplink traffic on another frequency. However, some or all of the mobile stations in the network may only have half duplex capability, i.e., they can transmit on one frequency and receive on another frequency, but cannot do both at the same time. For the overall network to be efficient under these conditions, the base station should carefully schedule traffic so that it is transmitting to some mobile stations and receiving from other mobile stations at the same time, in a way that tries to minimize idle time on both uplink and downlink channels. In this regard, multicast traffic, and in particular multicast and broadcast service (MBS) traffic, may present particular problems, since large numbers (possibly all) of the mobile stations may need to be able to receive the same downlink traffic at the same time, and will therefore be unable to transmit uplink communications to the base station during that period. This can make inefficient use of the network's uplink capacity.

BRIEF DESCRIPTION OF THE DRAWINGS

Some embodiments of the invention may be understood by referring to the following description and accompanying drawings that are used to illustrate embodiment of the invention. In the drawings.

DETAILED DESCRIPTION

Figure 1:
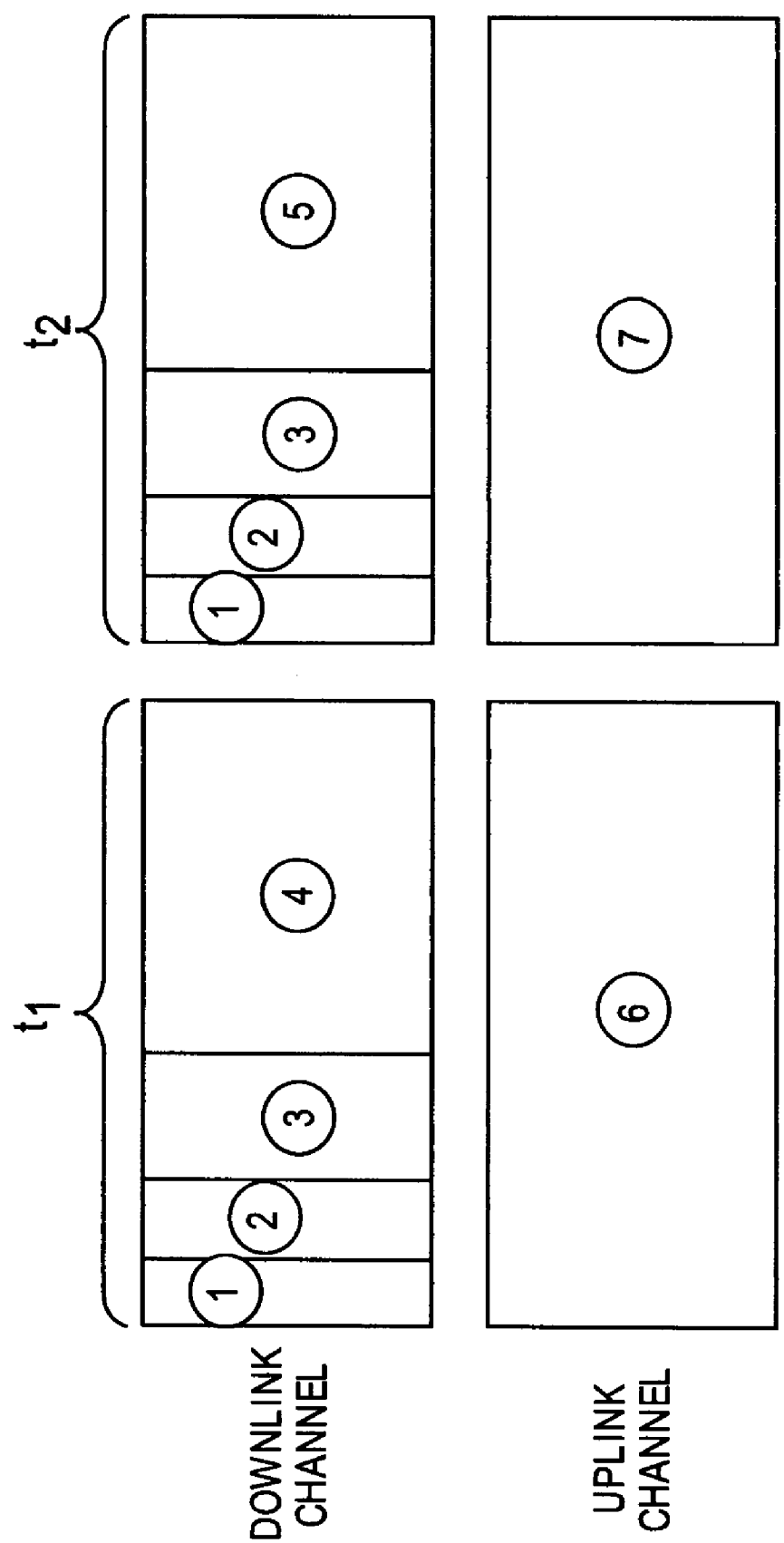
FIG. 1 shows a diagram of unlink traffic, according to an embodiments of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data through the use of modulated electromagnetic radiation through a non-solid medium. The term does not imply that the associated devices do not contain any wires, although in some embodiments they might not. The term "mobile wireless device" is used to describe a wireless device with the capability to be in motion while it is communicating.

Some embodiments of the invention transmit a particular set of multicast data traffic more than once, and in separate frames. Multicast traffic, as used herein, refers to transmissions in which multiple, known destination devices (e.g., wireless mobile stations) are configured to recognize the same destination address in the transmission and receive the data associated with that destination address. This differs from unicast (each destination address is recognized by only a single destination device), and broadcast (the transmission is intended for any device on the channel that is able to receive it). For the purposes of this document, 'multicast' also includes transmissions in which a known set of specific mobile devices are intended to receive the transmission based on some identifier in the transmission other than a destination address.

For mobile stations that cannot receive and transmit at the same time, sending the same multicast traffic more than once permits some of those mobile stations to make uplink transmissions during a first downlink frame and receive the unicast traffic during the subsequent downlink frame, while other mobile stations may receive the unicast traffic during the first downlink frame and make uplink transmissions during the subsequent downlink frame. Thus, all the intended mobile stations have a chance to receive the multicast traffic, while transmissions from some mobile stations may occur during both frames, thus making more efficient use of the network's available uplink bandwidth. If the base station controls when every mobile station transmits, the base station can schedule this mix of traffic for overall network efficiency. Although conventional base stations may resend the same data to the same destination device(s) when requested to do so (e.g., if the data was corrupted upon receipt and the mobile station requests a retransmission), the embodiments described herein send the same data twice without being requested to by a destination device. Note: within the context of this document, all references to transmissions, receptions, traffic, channel, frames, uplink, and downlink, pertain to wireless communications unless otherwise specified.

FIG. 1 shows a diagram of uplink and downlink traffic, according to an embodiment of the invention. The drawing is not to scale, and no inference should be made about the relative length or duration of different portions of the transmission based on their relative size in the drawings. In the illustrated embodiment, the vertical axis shows two channels, one wireless channel for downlink transmissions from a base station to various mobile devices, and the other wireless channel for uplink transmissions from the mobile devices to the base station. In various embodiments, a 'channel' may represent a single frequency, a frequency band, or a collection of frequencies or frequency bands that are all used together to transmit a package of data. Various modulation techniques may be used, such as but not limited to one or more of: 1) code division multiple access (CDMA), 2) frequency division multiple access (FDMA), 3) orthogonal frequency division multiple access (OFDMA), 4) ultra-wide band (UWB), or 5) any other feasible modulation technique. The horizontal axis shows time. t1 indicates the time during which a first downlink frame is transmitted, while t2 indicates a subsequent time during which a second downlink frame is transmitted. As shown, the uplink transmissions may correspond in time with the downlink frames.

In some embodiments, each downlink frame may start with a preamble 1 that permits the receiving devices to synchronize on the following data, a MAP 2 that defines the contents of the downlink frame, and a multicast portion 3 that contains data that is intended for multiple particular mobile stations. The remainder 4 of the first downlink frame, and the remainder 5 of the second downlink frame, may contain other data such as unicast data addressed to individual mobile stations. Each MAP may indicate various things, such as but not limited to: 1) which destination addresses are in the current downlink frame, and where their associated data is located in the frame, and 2) which devices are authorized to transmit over the uplink channel, and when they are authorized for their particular transmission. In some instances, a particular downlink frame may contain MAP information authorizing one or more particular mobile devices to transmit during a subsequent downlink frame.

Two uplink time periods are also shown. Region 6 indicates a time during which certain, specified mobile stations are scheduled to transmit over the uplink channel. This time period t1 may correspond in time to the first indicated downlink frame. Region 7 indicates a time during which certain other specified mobile stations are scheduled to transmit over the uplink channel. This second time period t2 may correspond in time to the second indicated downlink frame.

Many mobile stations, although capable of receiving over the downlink channel and transmitting over the uplink channel, are not capable of transmitting and receiving at the same time. Therefore, if a particular mobile station is transmitting over the uplink channel, it will not be able to receive anything over the downlink channel during its own transmission. Although the particular mobile station may not be transmitting during the entire downlink frame, to receive anything during that downlink frame it must be able to receive the preamble (to synchronize on the following data), and the MAP (to find out where its data, if any, is located in that frame). Therefore a mobile station that is transmitting during the preamble and/or the MAP of a downlink frame may not be able to receive anything during that downlink frame.

Since the base station schedules communications for each mobile station, the base station may determine whether a particular mobile station needs to receive any part of a particular downlink frame. For example, if the downlink frame does not contain anything directed to that particular mobile station, either through a unicast address, a multicast address, or a broadcast, then that mobile station may not need to receive, or even know about the existence of, that particular downlink frame. If the base station determines that a particular mobile station does not need to receive any part of the downlink frame, that particular mobile station may be scheduled to transmit during the downlink frame.

However, there are some types of multicast transmissions, such as multicast and broadcast service (MBS) transmissions, that are intended for all or a large portion of all of the active mobile stations communicating with the base station. In a conventional network, a base station would not schedule any of these intended recipients to transmit during the preamble, MAP, or multicast portions of the downlink frame. This might leave the uplink channel unused or underused during those portions of the downlink frame, resulting in inefficient use of the network's capacity. In some embodiments of the invention, the multicast portion may be transmitted again in a subsequent downlink frame. By transmitting the same multicast portion twice, the intended recipients for that multicast transmission may be divided into two groups. The first group may be scheduled to receive the multicast transmission during the first downlink frame and be scheduled to transmit during the second downlink frame, while the second group may be scheduled to transmit during the first downlink frame and be scheduled to receive the multicast transmission during the second downlink frame. In this manner, the uplink channel may be efficiently utilized during both the downlink frames, and all intended recipients of the multicast transmission may have a chance to receive it.

In some embodiments the two downlink frames containing duplicate multicast portions may be consecutive frames transmitted from the base station, but in other embodiments other downlink frames may be transmitted between these two downlink frames. Although the preceding example uses two frames to carry duplicate copies of the multicast data, other embodiments may extend this principle by transmitting the same information in more than two frames, and may correspondingly divide the intended recipients into more than two groups. Although the preceding example duplicates only the multicast transmissions, other embodiments may duplicate other types of transmissions.

Figure 2:
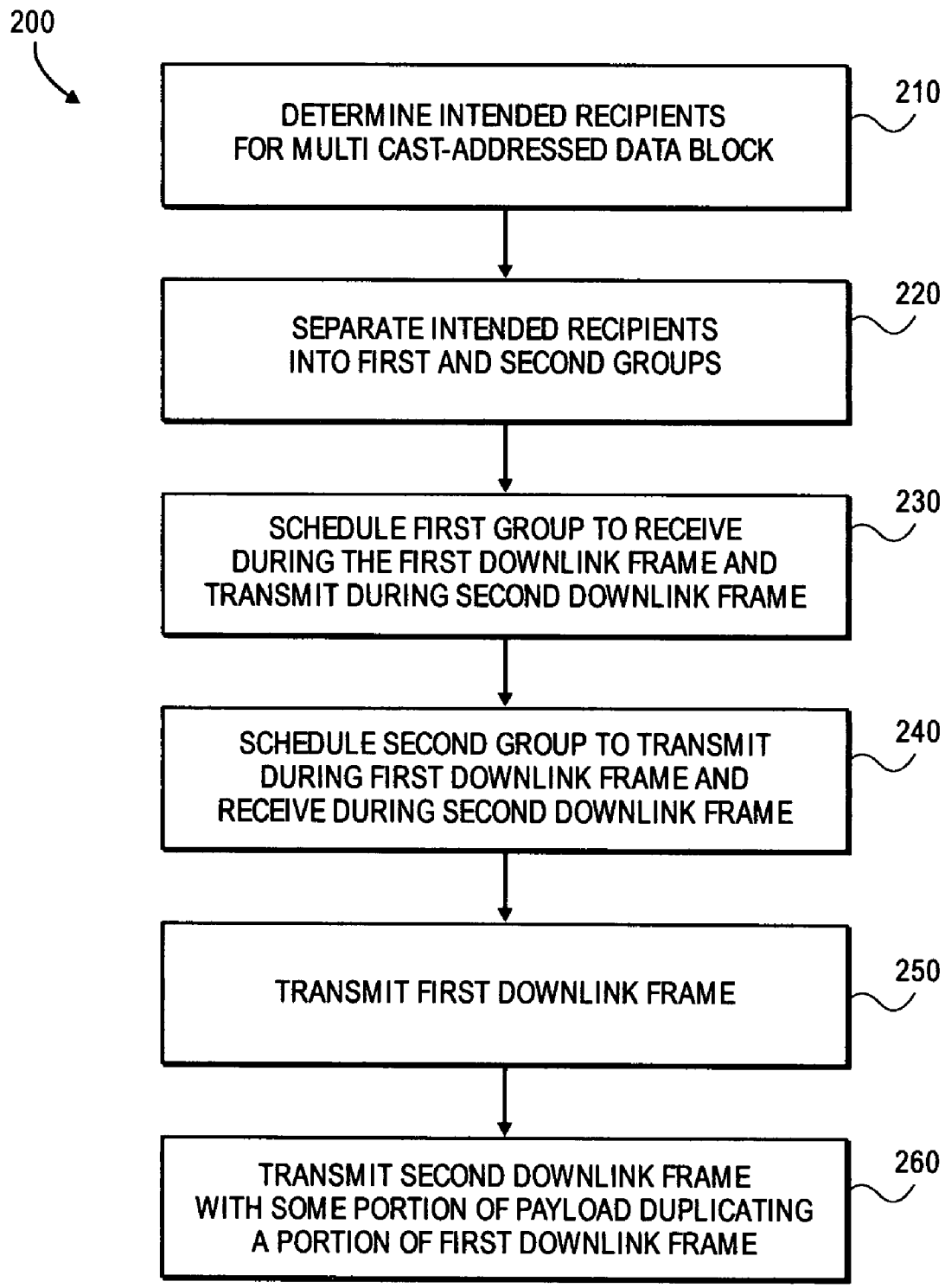
FIG. 2 shows a flow diagram of a method of scheduling mobile stations by a base station, according to an embodiment of the invention.

FIG. 2 shows a flow diagram of a method of scheduling mobile stations by a base station, according to an embodiment of the invention. In the illustrated flow diagram 200, a base station may determine which recipients are intended to receive a transmission that is addressed to multiple recipients (i.e., the transmission contains one or more addresses indicating that multiple mobile stations are intended to receive the same message).

The base station may separate the intended recipients into two (or more) subsets at 220. When scheduling these various recipients to transmit their data traffic back to the base station, at 230 the base station may schedule the members of the first subset to receive (i.e., to not transmit) during a time scheduled for a first downlink frame from the base station, and to transmit during a time scheduled for a second downlink frame from the base station. Similarly, at 240 the base station may schedule the members of the second subset to transmit during the time scheduled for the first downlink frame from the base station, and to receive during the time scheduled for the second downlink frame from the base station.

At 250 and 260 the base station may transmit the first and second downlink frames. The second downlink frame may contain some portion that duplicates a similar portion of the payload in the first downlink frame that is intended to be received by all members of the first and second groups. By duplicating this portion of the payload, all members of both of the previously-determined recipient groups may have a chance to receive that portion in at least one of the downlink frames. As previously stated, in various embodiments the two downlink frames may or may not be consecutively-transmitted frames.

This same concept (resending portions of a frame in a subsequent frame) may also have other advantages. In a conventional network, depending on channel conditions, some random portions of a frame may be corrupted when they are received, and the receiving device may have to request a retransmission of all or a part of the frame. Requesting, scheduling, and executing such retransmissions may have seriously detrimental effects on channel throughput. However, if the same data is transmitted twice, in two separate frames, to the same recipient, a corrupted portion of one frame may be received correctly in the other frame, and the receiving device may be able to reconstruct all the original data by combining the correct portions from each frame, thus avoiding the need to request a retransmission. This technique may provide such an improvement that the base station can increase the modulation rate (and hence the data throughput rate), even though this may increase received data errors, because the time lost in retransmitting the same data twice may be more than made up for by the time saved in using the higher modulation rate.

Figure 3:
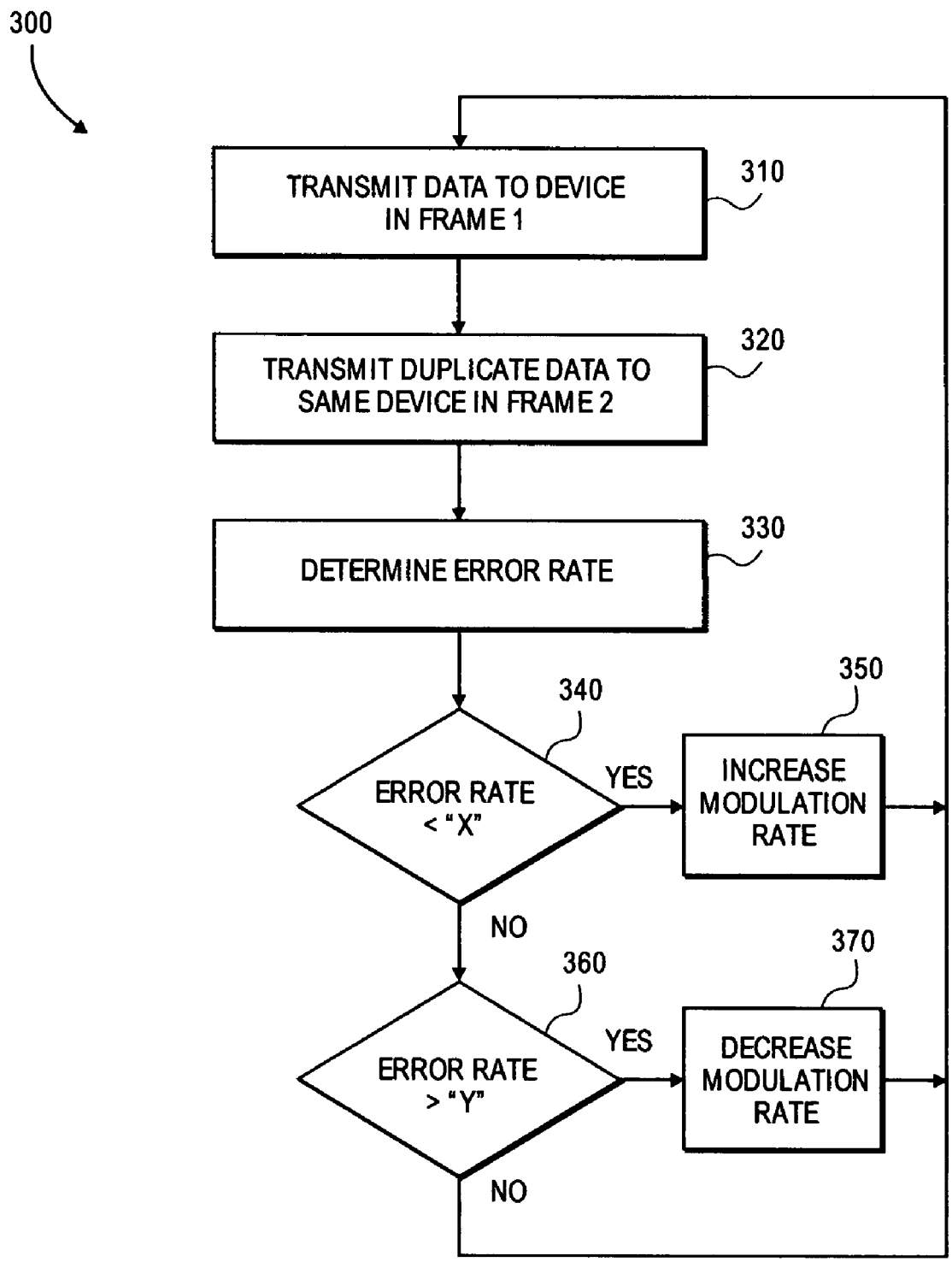
FIG. 3 shows a flow diagram of a method of retransmitting data by a base station, according to an embodiments of the invention.

FIG. 3 shows a flow diagram of a method of retransmitting data by a base station, according to an embodiment of the invention. Flow diagram 300 shows a method of using duplicate transmissions to permit increasing the modulation rate, while automatically adjusting that modulation rate to compensate for changing channel conditions. At 310, a base station may transmit data to a particular mobile station in a first frame. At 320, the base station may transmit that same data to the same mobile station in a second frame, so that the mobile station may reconstruct any data that was incorrectly received in the first frame.

At 330, the base station may determine the error rate seen by the mobile device. In many embodiments, this determination may occur when the base station receives the error rate in a transmission from the mobile device, which has itself calculated the error rate. The error rate may have been determined over some suitable period of time, and in some embodiments may have included multiple frames. The error rate may represent various types of errors, such as those discussed later. At 340 the error rate may be compared with a predetermined value "X". If the error rate is less than that value, the base station may increase the modulation rate at 350 for subsequent transmissions to that mobile station. If the error rate exceeds "X", it may be compared with a higher error rate "Y" at 360. If the error rate exceeds "Y", the base station may decrease the modulation rate at 370 for subsequent transmissions to that mobile station. If the error rate falls between "X" and "Y", the modulation rate may be left unchanged for subsequent transmissions to that mobile station. The values for X and Y may be chosen based on various criteria. In some embodiments, the value of "X" and/or "Y" may be dynamically changed during network operation, based on various criteria.

Figure 4:
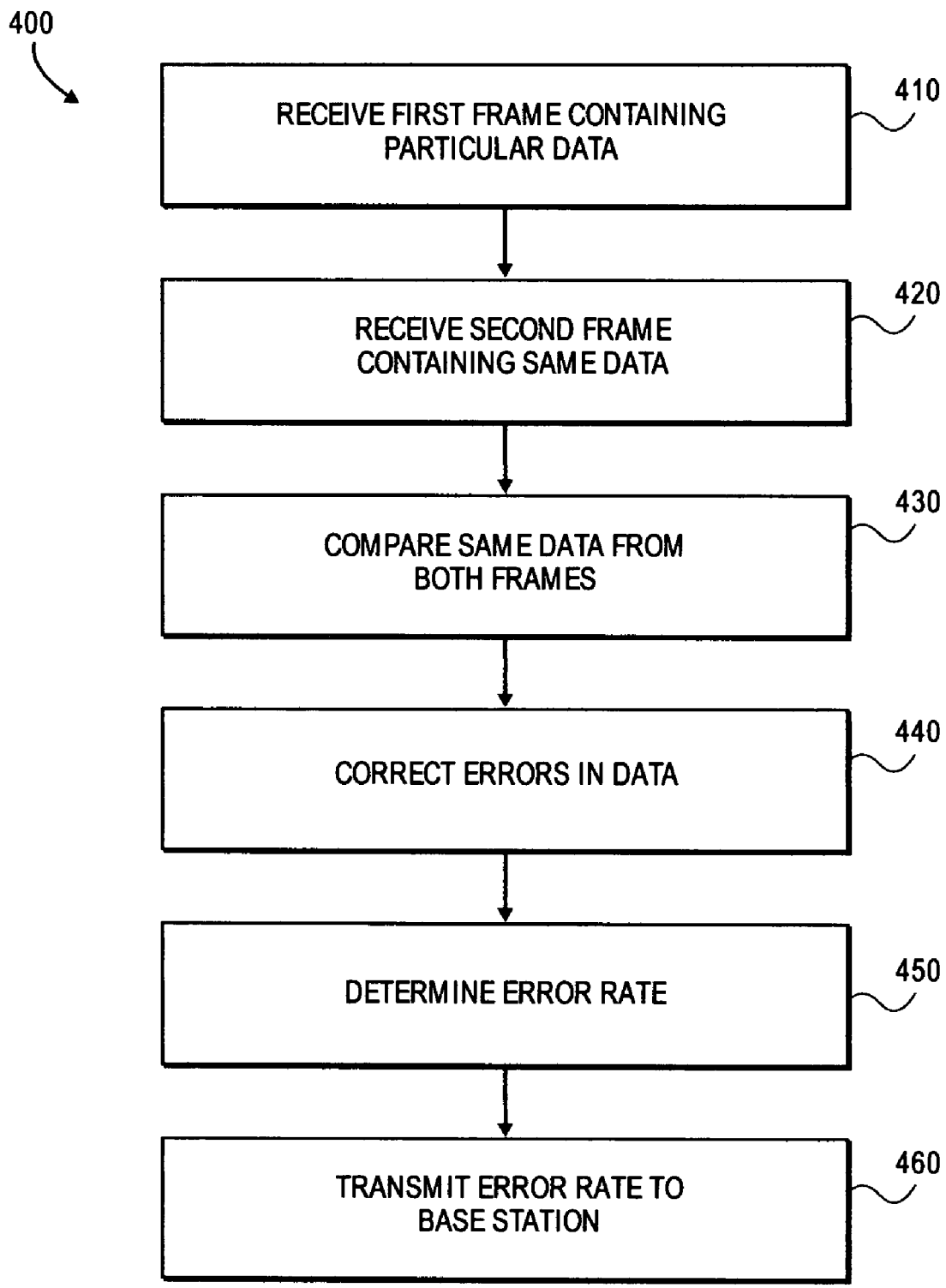
FIG. 4 shows a flow diagram of a method of receiving duplicate sets of data by a mobile station, according to an embodiments of the invention.

FIG. 4 shows a flow diagram of a method of receiving duplicate sets of data by a mobile station, according to an embodiment of the invention. In flow diagram 400, at 410 the mobile station receives a first frame containing a particular set of data that is addressed to the mobile station, and locates any non-correctable errors in the data. Non-correctable errors are those errors that cannot be corrected using error-correcting information in the frame, for example, an error correcting code (ECC) at the end of the data. To the extent possible, any errors that can be corrected using an ECC or other self-contained information may be corrected at this time. At 420 the mobile station receives a second frame containing a copy of the same set of data, and again corrects any correctable errors and locates any non-correctable errors. Due to the typically random nature of errors in wireless communications, it is likely that the non-correctable errors in the first frame are located in different places in the data than are the non-correctable errors in the second frame. If an error is found at a particular point of one frame, it is highly likely that the same point in the other frame will contain no error. By replacing the corrupted parts of the data from one frame with the correctly-received parts of that same data from the other frame, it may be possible to construct an error-free set of that data at 440. If errors occur at the same point in both frames, the mobile station may have to take other corrective actions, such as but not limited to requesting a retransmission of the data (not shown).

Some embodiments of the invention may try to maximize overall throughput by increasing the modulation rate until the resulting error rate becomes so great that overall throughput is reduced. This can be accomplished by determining the error rate at 450, and transmitting the value of that error rate to the base station at 460. The base station may then increase or decrease the modulation rate for subsequent transmissions to this mobile station, as previously shown in FIG. 3. The error rate may be determined in various ways, such as but not limited to counting only errors that could not be corrected by the operation at 440. Overall throughput may be determined in various ways, such as but not limited to: 1) the number of received frames per unit of time not requiring a request for retransmission, 2) the number of received multicast blocks (or other specific sub-frame blocks of data) received per unit of time and not requiring a request for retransmission, 3) the amount of total data per unit of time not requiring a request for retransmission, 4) etc. Some versions of throughput may consider only one instance of duplicate blocks transmitted in more than one frame, but other versions may consider both (or all, if the data is sent more than twice) such blocks.

Figure 5:
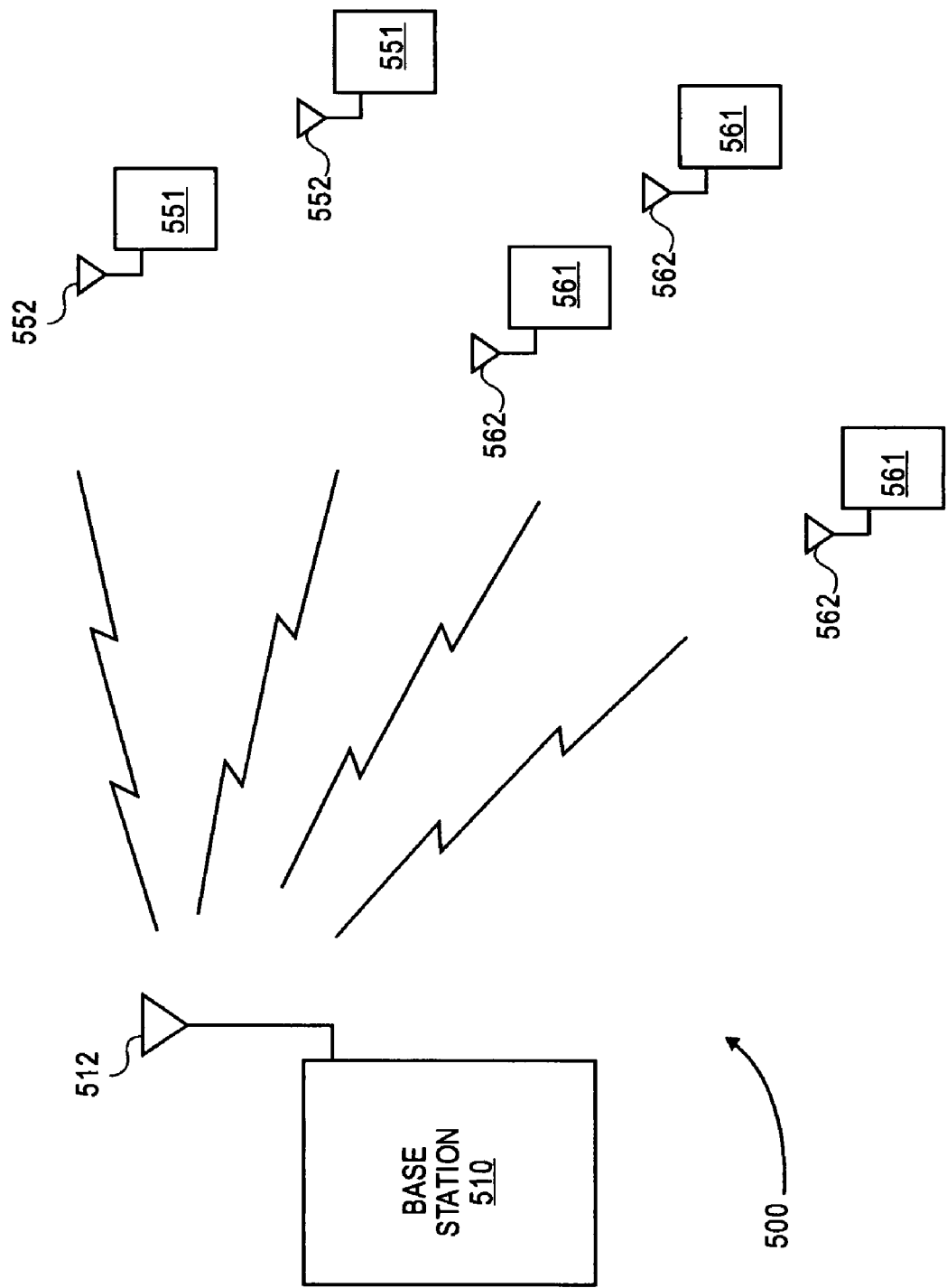
FIG. 5 shows a wireless network, according to an embodiment of the invention.

FIG. 5 shows a wireless network, according to an embodiment of the invention. In the illustrated network 500, base station 510 can communicate wirelessly through its antenna 512 with multiple mobile stations. For purposes of illustration, the mobile stations have been divided into two groups. The first group includes two mobile stations 551 with their antennas 552, while the second group includes three mobile stations 561 with their antennas 562. This distinction is solely to show that the mobile stations in the network may be artificially divided into multiple groups for operational purposes. In reality, each group may contain more or fewer mobile stations than shown, a given mobile station may be moved from one group to another, and any mobile station in either group may be different from, or the same as, any other mobile station in either group. Each mobile station may be any feasible mobile wireless device such as, but not limited to: 1) a laptop or notebook computer, 2) a personal data assistant, 3) a cellular phone, 4) an ultra-mobile device, 5) etc. Each antenna may be any feasible antenna, such as but not limited to: 1) a dipole antenna, 2) a monopole antenna, 3) a slot antenna, 4) etc.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A method, comprising:
scheduling, prior to transmitting a first downlink frame, a first subset of mobile stations in a group of mobile stations to transmit during the first downlink frame;
scheduling, prior to transmitting a second downlink frame, a second subset of mobile stations in the group to transmit during the second downlink frame;
wirelessly transmitting the first downlink frame containing a particular block of data addressed to all the mobile stations in the group of mobile stations; and
wirelessly transmitting the second downlink frame containing the particular block of data addressed to all the mobile stations in the group of mobile stations;
wherein the second downlink frame is transmitted without receiving a request for retransmission of the particular block from any of the mobile stations.

2. The method of claim 1, wherein the first and second downlink frames each include a same multicast address which is applicable to all mobile stations in the group.

3. The method of claim 1, wherein the first and second downlink frames each include identical unicast addresses that identify all mobile stations in the group.

4. The method of claim 1, wherein said scheduling the first and second subsets comprises transmitting schedule information for the each of the mobile stations in the first and second subsets.

5. An apparatus, comprising
a base station for communicating in a wireless network, the base station to:
schedule, prior to transmitting a first downlink frame, a first subset of mobile stations in a group of mobile stations to transmit during the first downlink frame;
schedule, prior to transmitting a second downlink frame, a second subset of mobile stations in the group to transmit during the second downlink frame;
wirelessly transmit the first downlink frame containing a particular block of data addressed to all the mobile stations in the group of mobile stations; and
wirelessly transmit the second downlink frame containing the particular block of data addressed to all the mobile stations in the group of mobile stations;
wherein the second downlink frame is transmitted without receiving a request for retransmission of the particular block from any of the mobile stations.

6. The apparatus of claim 5, wherein the first and second downlink frames are each to include a same multicast address which is applicable to all mobile stations in the group.

7. The apparatus of claim 5, wherein the first and second downlink frames are each to include identical unicast addresses that identify all mobile stations in the group.

8. The apparatus of claim 5, wherein said scheduling the first and second subsets comprises transmitting schedule information for the each of the mobile stations in the first and second subsets.

9. An article comprising
a computer-readable non-transitory storage medium that contains instructions, which when executed by one or more processors result in performing operations comprising:
scheduling, prior to transmitting a first downlink frame, a first subset of mobile stations in a group of mobile stations to transmit during the first downlink frame;
scheduling, prior to transmitting a second downlink frame, a second subset of mobile stations in the group to transmit during the second downlink frame;
wirelessly transmitting the first downlink frame containing a particular block of data addressed to all the mobile stations in the group of mobile stations; and
wirelessly transmitting the second downlink frame containing the particular block of data addressed to all the mobile stations in the group of mobile stations;
wherein the second downlink frame is transmitted without receiving a request for retransmission of the particular block from any of the mobile stations.

10. The article of claim 9, wherein the first and second downlink frames each include a same multicast address which is applicable to all mobile stations in the group.

11. The article of claim 9, wherein the first and second downlink frames each include identical unicast addresses that identify all mobile stations in the group.

12. The article of claim 9, wherein the operation of scheduling the first and second subsets comprises transmitting schedule information for the each of the mobile stations in the first and second subsets.

* * * * *